United States Patent [19]

Miller

[11] 4,378,882

[45] Apr. 5, 1983

[54] STORAGE DEVICE FOR FISHING REELS

[76] Inventor: James A. Miller, 204 E. Diamond St., Kendallville, Ind. 46755

[21] Appl. No.: 303,932

[22] Filed: Sep. 21, 1981

[51] Int. Cl.³ .................. B65D 85/00; B65D 85/62; B65D 81/00; A63B 55/00

[52] U.S. Cl. .................. 206/315 R; 206/45.14; 242/84.1 R; 269/243; 312/246; 312/DIG. 33; 43/22

[58] Field of Search .................. 206/315 R, 45.14; 242/84.1 R, 84.2 R; 312/246, 245, DIG. 33; 43/22, 21.2; 269/243

[56] References Cited

U.S. PATENT DOCUMENTS 1,755,295  4/1930  Hellman .................. 206/45.14
2,001,570  5/1935  Fenton .................. 242/84.1 R
3,848,737  11/1974  Kenon .................. 206/315 R Primary Examiner—William T. Dixson, Jr.

Attorney, Agent, or Firm—Gust, Irish, Jeffers & Hoffman

[57] ABSTRACT

A storage device for fishing reels comprising an enclosure having an access opening and a first wall on which is mounted at one end a plurality of spaced supporting posts. Each of the posts is provided with two spaced reel-retaining keepers, one of these being secured and the other being movable longitudinally of the post. The post is threaded adjacent the position of the movable keeper and a nut is threaded thereon for the purpose of retaining the movable keeper against movement away from the secured keeper. The opposite ends of an elongated mounting foot of a fishing reel are engageable with the keepers in such manner that the tightening of the nut serves in securing the reel to the respective post. A door is provided on the enclosure for closing the opening thereof whereby unobstructed access to the post is available.

10 Claims, 4 Drawing Figures

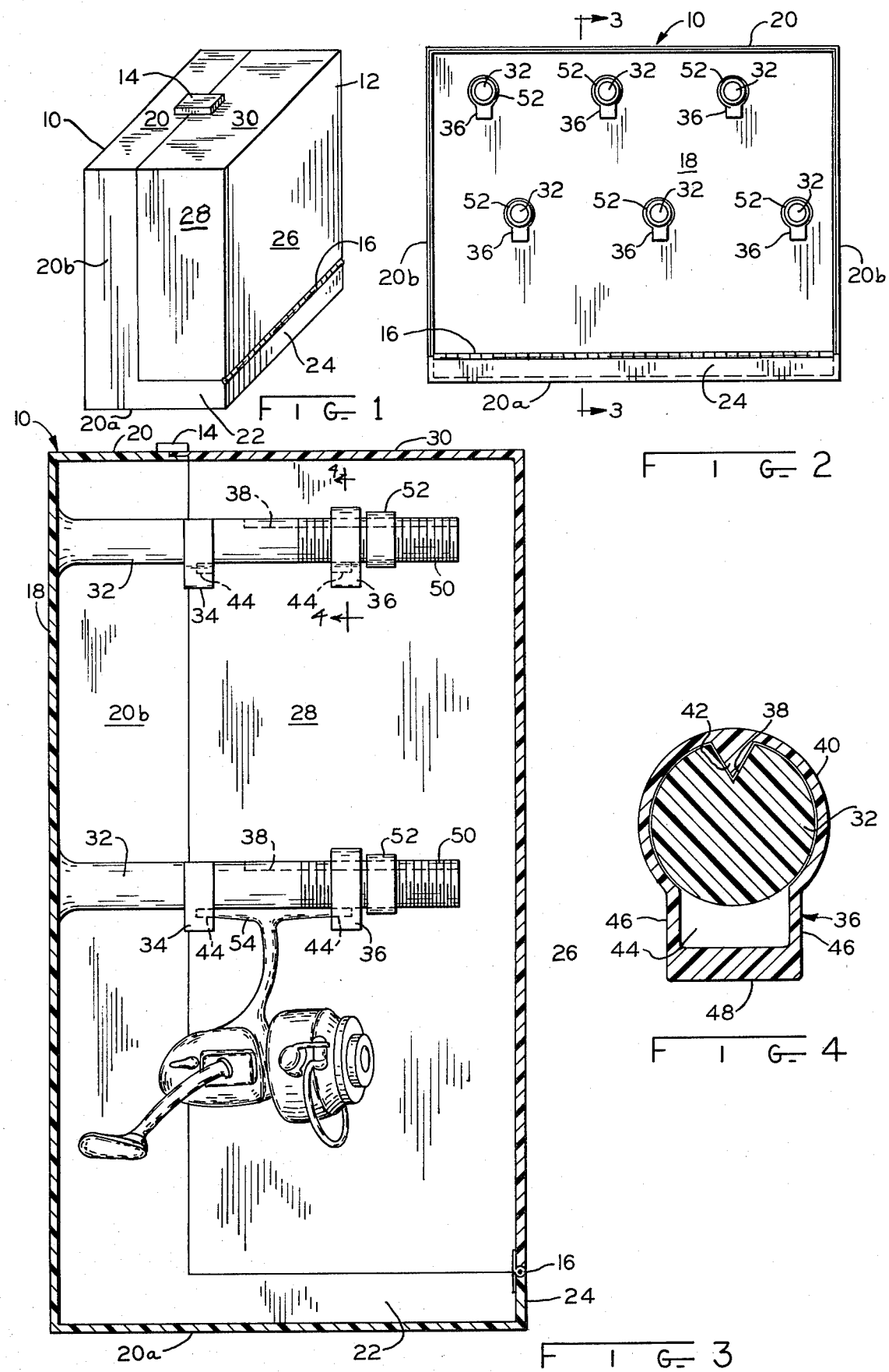

4,378,882

STORAGE DEVICE FOR FISHING REELS

BACKGROUND OF THE INVENTION

1. Field of the Invention

The present invention relates to storage devices for fishing reels and more particularly to a portable storage case in which fishing reels may be securely mounted and transported.

2. Description of the Prior Art

Typical arrangements for attaching fishing reels to supports are disclosed in U.S. Pat. Nos. 2,532,119; 2,650,449; 2,999,621; 3,641,697 and 4,171,588. Ordinarily, when a fishing reel is stored after use, it is left on the fishing rod itself or is removed and loosely placed in a conventional tackle box. So stored, the reel is apt to be damaged from accidental impact and if wet may not dry properly.

SUMMARY OF THE INVENTION

This invention relates to a storage device for fishing reels comprising an enclosure having an access opening and a first wall on which is mounted at one end a plurality of spaced supporting posts. The posts extend outwardly from the wall in substantial parallelism, each post having two spaced reel-retaining keepers thereon. One of the keepers is secured against movement and the other is movable longitudinally. Means are provided for holding the movable keeper against movement away from the secured keeper whereby a reel may be securely but removably mounted on a post. Such means may include a nut threaded onto the post so as to bear against the movable keeper.

In one form of the invention the enclosure is provided with four sides extending from the wall in a direction substantially parallel to the posts. The posts project beyond the outer edges of the sides a distance which exposes the keepers. A cover is hingedly mounted on the enclosure and is movable between closed and opened positions, the cover in closed position serving to complete the enclosure of the posts and in open position to exposure the same for gaining unobstructed access thereto.

It is an object of this invention to provide a storage device for fishing reels by means of which reels may be securely mounted and enclosed for storage, such device being provided with a cover by means of which unobstructed access to the reels may be gained.

The above-mentioned and other features and objects of this invention and the manner of attaining them will become more apparent and the invention itself will be best understood by reference to the following description of an embodiment of the invention taken in conjuction with the accompanying drawings.

BRIEF DESCRIPTION OF THE DRAWINGS

In the drawings, FIG. 1 is a perspective view of one embodiment of this invention;

FIG. 2 is a front elevational view thereof but with the cover removed;

FIG. 3 is a cross-section taken substantially along section line 3—3 of FIG. 2 but also showing the cover installed in closed position; and FIG. 4 is a fragmentary cross-section taken substantially along section line 4—4 of FIG. 3.

DESCRIPTION OF THE PREFERRED EMBODIMENT

Referring to the drawings, FIG. 1 discloses a rectangular, storage case composed of essentially two parts, an enclosure 10 and a cover 12. A manually manipulable latch 14 is mounted on the enclosure and cover to hold the cover closed. The cover 12 is mounted on the enclosure 10 by means of a hinge 16 such that the cover 12 may be opened thereby exposing the interior of the enclosure 10.

The enclosure 10 has a flat rear wall 18 and four upstanding sides indicated by the numeral 20, the side 20a being longer than the other three and thereby serving as a bottom of the case. This is shown more clearly in FIGS. 1 and 3 wherein the two lateral sides indicated by the numeral 20b are shown to be of the same height as the top side 20 but with an extension 22 formed thereon which serves to define the bottom side 20a. A strip panel 24 of short height attaches at its ends to the front edges of the extensions 22, the hinge 16 being secured to the upper edge of the strip panel 24.

The cover 12 is composed of the front panel 26, two sides 28 and the top 30 which serve as extensions of the enclosure sides when the cover 12 is closed as shown in FIG. 1. The edges of the enclosure sides 20 and 20b provide an access opening which the cover 12 closes.

Secured at one end to the rear wall 18 of the enclosure are a plurality of supporting posts 32, these being spaced apart and parallel as shown. Preferably, the enclosure 10 is molded of plastic with the supporting posts 32 being integrally molded therewith in the same molding operation. Since all of the supporting posts 32 are formed the same, a description of one will suffice for all.

Each of the posts 32 has two reel-retaining keepers 34 and 36 thereon, the keeper 34 being secured in position and the keeper 36 being longitudinally movable. Preferably, the keeper 34 is integrally molded with the respective post 32. As is shown in FIGS. 3 and 4, the post 32 has a V-shaped, axially extending groove 38 formed therein which extends from the outer end for a distance just short of the keeper 34. The keeper 36 has a part cylindrical portion 40 which slidably fits over the post 32 as shown and is further provided with a V-shaped key which slidably fits into the groove 38. Thus, the keeper 36 is capable of moving longitudinally of the post 32 but will be retained against rotation relative thereto.

Both of the keepers 34 and 36 have cavities or recesses 44 formed therein immediately adjacent the post 32, the keeper 36 having the recess 44 formed by the two side portions 46 and a bottom 48. The upper side of the recess 44 is defined by the post 32 itself.

The outer end portion of the post 32 is threaded as shown at 50, and a nut 52 is received thereon to an extent as will bear against the keeper 36. The purpose of the nut 52 is to movably adjust the keeper 36 toward the keeper 34 and to retain it against movement in an opposite direction. Thus the threads 50 may extend well toward the keeper 34.

As clearly shown in FIG. 3, the posts 32 have a length which extend outwardly far beyond the opening in the enclosure 10 as defined by the sides 20 and 20b. In fact, the portions of the posts which include the keepers 34 and 36 are exposed when the cover 12 is opened.

In use, the latch 14 is released so as to permit opening of the cover 12 about the hinge 16. This completely exposes the posts 32. The nuts 52 are turned in a direction to move them outwardly to permit corresponding movement of the keepers 36. Reels to be installed on the post 32 are ordinarily provided with an elongated mounting foot of some sort as indicated by the numeral 54, and as illustrated in FIG. 3, the opposite ends of this mounting foot 54 are inserted into the recesses 44 of the two keepers 34 and 36. This is accomplished by first inserting one end of the foot 54 into the recess 44 of the keeper 34 and then moving the keeper 34 until the recess 44 thereof fits over the other end of the foot. The nut 52 is then threaded against the keeper 36 thus securing the reel foot solidly and firmly against the post 32. Each of the posts 32 is adapted to have a reel secured thereto, since they are spaced apart and somewhat staggered as shown in FIG. 2.

With the case closed as in FIG. 1, and a suitable handle (not shown) provided thereon, a number of reels may be conveniently carried. After use, a reel may be washed and then installed into the case where it can conveniently dry. The case has a large enough interior as shown that air can freely circulate thereabout.

All parts of the storage device are formed of plastic with the possible exception of the hinge 16 and latch 14. Thus, the device is immune from problems due to corrosion.

While there have been described above the principles of this invention in connection with specific apparatus, it is to be clearly understood that this description is made only by way of example and not as a limitation to the scope of the invention.

What is claimed is:

1. A storage device for fishing reels comprising an enclosure having an access opening and a first wall, a plurality of spaced supporting posts secured at one end to said wall and projecting outwardly therefrom, each of said posts having two spaced reel-retaining keepers thereon, one of said keepers being secured against movement and the other being movable longitudinally of the respective post, and first means for holding said movable keeper against movement away from said secured keeper.

2. The device of claim 1 including second means for holding said movable keeper against rotation but permits movement longitudinally of its post.

3. The device of claim 2 wherein said first means includes a nut threaded onto the outer end of a post which is engageable with said movable keeper.

4. The device of claim 3 wherein said second means includes an axially extending groove in one of said movable keeper and its post which slidably receives a radially extending key in the other.

5. The device of claim 4 wherein said keepers on a given post have radial portions provided with facing recesses, said radial portions and recesses being opposite each other longitudinally of the supporting post.

6. The device of claim 5 wherein said enclosure has four sides extending from said wall in a direction substantially parallel to said posts, said posts projecting beyond the outer edges of said sides a distance which exposes said keepers, and a cover hingedly mounted on said enclosure and movable between closed and open positions, said cover in closed position serving to complete the enclosure of said posts and in open position to expose the same for gaining unobstructed access thereto.

7. The device of claim 6 wherein said cover also includes four sides which are engageable with the four enclosure sides, respectively, thereby to surround and conceal completely said posts.

8. The device of claim 7 wherein said enclosure and posts are of plastic integrally joined, said secured keeper being of plastic and integrally joined to the respective post, said movable keeper and said nut also being of plastic.

9. The device of claim 8 wherein there are two spaced parallel rows of said posts, all of the keepers on said posts extending in common radial directions therefrom.

10. The device of claim 9 wherein said enclosure and cover are orthogonally shaped, said first wall being flat, each said post being cylindrical, each movable keeper having a tubular portion which is slidably retained on its said post, said radial portion on said keeper being a radial extension provided with said recess therein, said recess being defined by sides and a bottom, said bottom being radially opposite the post, and said recess further having the top thereof defined by said post.

* * * * *